(12) United States Patent
Pickersgill et al.

(10) Patent No.: US 9,836,190 B2
(45) Date of Patent: Dec. 5, 2017

(54) METHOD AND APPARATUS FOR RESTRICTING USER OPERATIONS WHEN APPLIED TO CARDS OR WINDOWS

(76) Inventors: Jason Douglas Pickersgill, Los Angeles, CA (US); Gregory Gudorf, Sunland, CA (US); Kenneth Alan Rudman, South Pasadena, CA (US); Vasil Nadzakov, Los Angeles, CA (US); Andrew Yoon, Los Angeles, CA (US); Roger Yeh, San Marino, CA (US); Basil Badawiyeh, Santa Clara, CA (US); Genevieve Marie Pinvidic, Burbank, CA (US); Dana Shawn Forte, Castaic, CA (US); Dan Han Diep, San Gabriel, CA (US); Samir M. Ahmed, Glendale, CA (US); Lee Douglas Shartzer, Valencia, CA (US); John Frederick Bishop, Santa Monica, CA (US); James Earl Booth, Jr., Burbank, CA (US); Hao Chi Tran, El Monte, CA (US); Peter S. Lee, Calabasas Park, CA (US); Mark Leroy Walker, Castaic, CA (US); David Pettigrew, San Francisco, CA (US)

( * ) Notice: Subject to any disclaimer, the term of this patent is extended or adjusted under 35 U.S.C. 154(b) by 619 days.

(21) Appl. No.: 13/993,987

(22) PCT Filed: Dec. 21, 2011

(86) PCT No.: PCT/US2011/066420
§ 371 (c)(1),
(2), (4) Date: Jan. 27, 2014

(87) PCT Pub. No.: WO2012/088237
PCT Pub. Date: Jun. 28, 2012

(65) Prior Publication Data
US 2014/0298221 A1    Oct. 2, 2014

Related U.S. Application Data

(60) Provisional application No. 61/426,509, filed on Dec. 22, 2010, provisional application No. 61/429,741, filed on Jan. 4, 2011.

(51) Int. Cl.
*G06F 3/048* (2013.01)
*G06F 3/0484* (2013.01)
(Continued)

(52) U.S. Cl.
CPC .......... *G06F 3/0484* (2013.01); *G06F 3/0482* (2013.01); *G06F 3/0485* (2013.01);
(Continued)

(58) Field of Classification Search
None
See application file for complete search history.

(56) References Cited

U.S. PATENT DOCUMENTS

| 5,491,795 A | 2/1996 | Beaudet et al. |
| 5,499,334 A | 3/1996 | Staab |

(Continued)

FOREIGN PATENT DOCUMENTS

| CN | 101617288 | 12/2009 |
| JP | 6332661 | 12/1994 |

(Continued)

OTHER PUBLICATIONS

International Search Report Dated Oct. 12, 2012.

*Primary Examiner* — Hua Lu
(74) *Attorney, Agent, or Firm* — Tutunjian & Bitetto, P.C.

(57) ABSTRACT

A user interface that displays a number of cards or windows is described where a user can move the cards in a horizontal direction freely. When a card resides in a locked zone, as defined by a user, the card will be able to be manipulated in a vertical direction, while cards that reside in a regular zone (Continued)

will not be able to be moved vertically. In addition, only cards that are in the locked zone can be subjected to a user action such as cutting content from the card, pasting content to the card, enlarging the contents of the card, or shrinking the contents of the card.

16 Claims, 19 Drawing Sheets

(51) Int. Cl.
*G06F 3/0482* (2013.01)
*G11B 27/034* (2006.01)
*G11B 27/10* (2006.01)
*G06F 3/0488* (2013.01)
*G06F 3/0485* (2013.01)
*G06F 17/30* (2006.01)

(52) U.S. Cl.
CPC ...... *G06F 3/04842* (2013.01); *G06F 3/04883* (2013.01); *G06F 17/30053* (2013.01); *G06F 17/30061* (2013.01); *G11B 27/034* (2013.01); *G11B 27/105* (2013.01); *G06F 2203/04806* (2013.01)

(56) References Cited

U.S. PATENT DOCUMENTS

| | | | |
|---|---|---|---|
| 6,538,672 B1 | 3/2003 | Dobbelaar | |
| 6,690,391 B1 | 2/2004 | Proehl et al. | |
| 7,426,467 B2 | 9/2008 | Nashida et al. | |
| 7,698,658 B2 | 4/2010 | Ohwa et al. | |
| 8,564,543 B2 | 10/2013 | Chaudhri | |
| 2003/0001898 A1 | 1/2003 | Bernhardson | |
| 2003/0001907 A1 | 1/2003 | Bergsten et al. | |
| 2005/0257152 A1 | 11/2005 | Shimizu et al. | |
| 2006/0048076 A1* | 3/2006 | Vronay | G06F 3/0482 715/850 |
| 2006/0195789 A1 | 8/2006 | Rogers et al. | |
| 2007/0245263 A1 | 10/2007 | Hale et al. | |
| 2008/0071827 A1 | 3/2008 | Hengel et al. | |
| 2008/0159708 A1 | 7/2008 | Kazama et al. | |
| 2008/0165141 A1* | 7/2008 | Christie | G06F 3/044 345/173 |
| 2008/0168403 A1* | 7/2008 | Westerman | G06F 3/04883 715/863 |
| 2008/0209468 A1 | 8/2008 | Milosevski | |
| 2009/0070363 A1 | 3/2009 | Bull et al. | |
| 2009/0204925 A1 | 8/2009 | Bhat et al. | |
| 2009/0241061 A1 | 9/2009 | Asai et al. | |
| 2009/0300497 A1 | 12/2009 | Billmaier et al. | |
| 2010/0001960 A1* | 1/2010 | Williams | G06F 3/04883 345/173 |
| 2010/0095240 A1* | 4/2010 | Shiplacoff | G06F 3/0483 715/784 |
| 2010/0131844 A1 | 5/2010 | Wohlert | |
| 2010/0162160 A1 | 6/2010 | Stallings et al. | |
| 2010/0205563 A1* | 8/2010 | Haapsaari | G06F 3/0485 715/825 |
| 2010/0211872 A1 | 8/2010 | Rolston et al. | |
| 2010/0229130 A1* | 9/2010 | Edge | G06F 3/04883 715/863 |
| 2010/0274674 A1 | 10/2010 | Roberts et al. | |
| 2010/0313110 A1* | 12/2010 | Claridge | G06F 3/0481 715/212 |
| 2011/0047504 A1* | 2/2011 | Wienands | G06F 3/0485 715/786 |
| 2011/0202834 A1* | 8/2011 | Mandryk | G06F 3/04883 715/701 |
| 2012/0102437 A1* | 4/2012 | Worley | G06F 3/04883 715/863 |

FOREIGN PATENT DOCUMENTS

| | | |
|---|---|---|
| JP | 2005037142 | 2/2005 |
| JP | 2005267390 | 9/2005 |
| JP | 2005354664 | 12/2005 |
| JP | 2006209563 | 8/2006 |
| JP | 2008167082 | 7/2008 |
| JP | 2006301871 | 11/2008 |
| JP | 2009224998 | 10/2009 |
| JP | 2009253618 | 10/2009 |
| JP | 2010503130 | 1/2010 |
| WO | WO2009143076 | 11/2009 |

* cited by examiner

METHOD AND APPARATUS FOR RESTRICTING USER OPERATIONS WHEN APPLIED TO CARDS OR WINDOWS

CROSS REFERENCE TO RELATED APPLICATIONS

This application claims the benefit, under 35 U.S.C. §365 of International Application PCT/US2011/066420 filed Dec. 21, 2011 which was published in accordance with PCT Article 21(2) on Jun. 28, 2012 in English and which claims the benefit of U.S. provisional patent applications No. 61/426,509 filed Dec. 22, 2010 and 61/429,741 filed Jan. 4, 2011.

TECHNICAL FIELD

The present disclosure generally relates to a user interface for displaying multiple windows/cards. More particularly, the present disclosure relates to a method for a user interface to selectively restrict the movement of cards while allowing other cards to be moved.

BACKGROUND OF THE DISCLOSURE

When using a media device such as a media player or a tablet, it is likely that a user will have multiple windows or cards of content open at one time. When a user attempts to manipulate such cards by initiating a gesture or some of command, sometimes the user unintentionally causes a window/card to be affected by the gesture even though the user meant the command for a different card.

SUMMARY OF THE INVENTION

A method is presented whereby a region in a display area is designated as a locked region, where cards that reside in such a region can be manipulated as a result of a command. Cards that do not reside in the specified region are left alone when the command is issued.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

DETAILED DESCRIPTION

The present disclosure provides several different embodiments of a user interface that is used for receiving, recording, playing back, purchasing, and the like media such as videos, television shows, movies, audio, music, video games, and the like. Such a user interface can be implemented on devices such as a computer, set top box, media server, tablet, mobile phone, personal media, device, portable video game system, video game system, and so forth.

The present disclosure provides several different embodiments of a user interface that is used for receiving, recording, playing back, purchasing, and the like media such as videos, television shows, movies, audio, music, video games, and the like. Such a system can be implemented on devices such as a computer, set top box, media server, tablet, mobile phone, personal media, device, portable video game system, video game system, and so forth.

Figure 1:
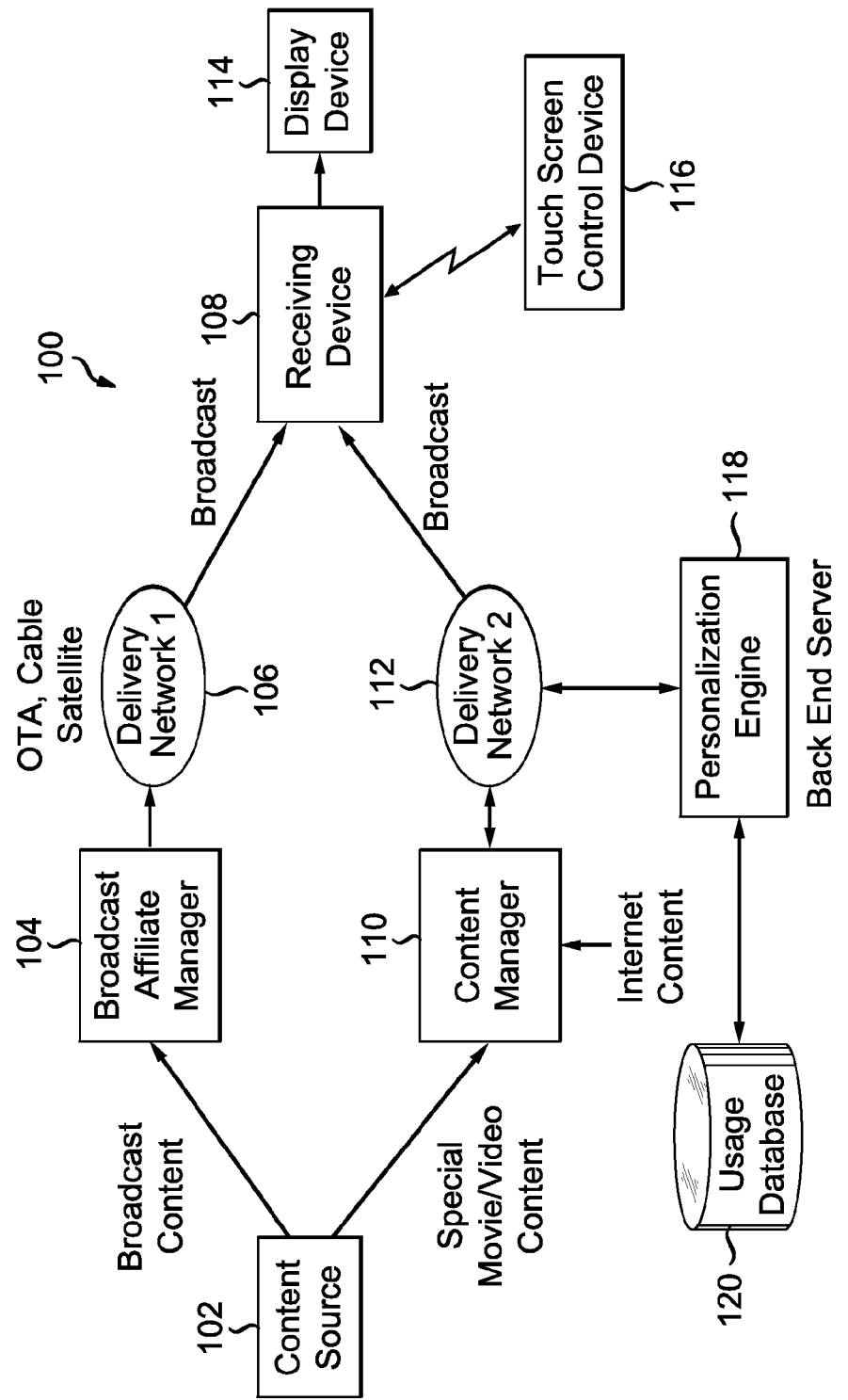
FIG. 1 is a block diagram of an exemplary system for delivering video content in accordance with the present disclosure.

Turning now to FIG. 1, a block diagram of an embodiment of a system 100 for delivering content to a home or end user is shown. The content originates from a content source 102, such as a movie studio or production house. The content may be supplied in at least one of two forms. One form may be a broadcast form of content. The broadcast content is provided to the broadcast affiliate manager 104, which is typically a national broadcast service, such as the American Broadcasting Company (ABC), National Broadcasting Company (NBC), Columbia Broadcasting System (CBS), etc. The broadcast affiliate manager may collect and store the content, and may schedule delivery of the content over a deliver network, shown as delivery network 1 (106). Delivery network 1 (106) may include satellite link transmission from a national center to one or more regional or local centers. Delivery network 1 (106) may also include local content delivery using local delivery systems such as over the air broadcast, satellite broadcast, or cable broadcast. The locally delivered content is provided to a media device 108 in a user's home, where the content will subsequently be searched by the user. It is to be appreciated that the media device 108 can take many forms and may be embodied as a set top box/digital video recorder (DVR), a gateway, a modem, etc. Further, the media device 108 may act as entry point, or gateway, for a home network system that includes additional devices configured as either client or peer devices in the home network.

A second form of content is referred to as special content. Special content may include content delivered as premium viewing, pay-per-view, or other content otherwise not provided to the broadcast affiliate manager, e.g., movies, video games or other video elements. In many cases, the special content may be content requested by the user. The special content may be delivered to a content manager 110. The content manager 110 may be a service provider, such as an Internet website, affiliated, for instance, with a content provider, broadcast service, or delivery network service. The content manager 110 may also incorporate Internet content into the delivery system. The content manager 110 may deliver the content to the user's media device 108 over a separate delivery network, delivery network 2 (112). Delivery network 2 (112) may include high-speed broadband Internet type communications systems. It is important to note that the content from the broadcast affiliate manager 104 may also be delivered using all or parts of delivery network 2 (112) and content from the content manager 110 may be delivered using all or parts of delivery network 1 (106). In addition, the user may also obtain content directly from the Internet via delivery network 2 (112) without necessarily having the content managed by the content manager 110.

Several adaptations for utilizing the separately delivered content may be possible. In one possible approach, the special content is provided as an augmentation to the broadcast content, providing alternative displays, purchase and merchandising options, enhancement material, etc. In another embodiment, the special content may completely replace some programming content provided as broadcast content. Finally, the special content may be completely separate from the broadcast content, and may simply be a media alternative that the user may choose to utilize. For instance, the special content may be a library of movies that are not yet available as broadcast content.

The media device 108 may receive different types of content from one or both of delivery network 1 and delivery network 2. The media device 108 processes the content, and provides a separation of the content based on user preferences and commands. The media device 108 may also include a storage device, such as a hard drive or optical disk drive, for recording and playing back audio and video content. Further details of the operation of the media device 108 and features associated with playing back stored content will be described below in relation to FIG. 2. The processed content is provided to a display device 114. The display device 114 may be a conventional 2-D type display or may alternatively be an advanced 3-D display.

The media device 108 may also be interfaced to a second screen such as a touch screen control device 116. The touch screen control device 116 may be adapted to provide user control for the media device 108 and/or the display device 114. The touch screen device 116 may also be capable of displaying video content. The video content may be graphics entries, such as user interface entries, or may be a portion of the video content that is delivered to the display device 114 The touch screen control device 116 may interface to media device 108 using any well known signal transmission system, such as infra-red (IR) or radio frequency (RF) communications and may include standard protocols such as infra-red data association (IRDA) standard, Wi-Fi, Bluetooth and the like, or any other proprietary protocols. Operations of touch screen control device 116 will be described in further detail below.

Optionally, media device 108 and touch screen control device 116 can be integrated into the same device. Examples of these media devices with a touch screen include computers, laptops, cell phones, personal media player, MP3 players, personal desk assistants, tablet devices, digital video recorders, and the like. For purposes of the this specification, the term media device 108 can encompass all of these type of devices with set top boxes, digital video recorders, gateway devices, and the like.

In the example of FIG. 1, the system 100 also includes a back end server 118 and a usage database 120. The back end server 118 includes a personalization engine that analyzes the usage habits of a user and makes recommendations based on those usage habits. The usage database 120 is where the usage habits for a user are monitored and information about such usage habits is stored. It is possible to use such user habit information to develop a profile for a user which is then used for recommending advertisements and programming. In some cases, the usage database 120 may be part of the back end server 118. In the present example, the back end server 118 (as well as the usage database 120) is connected to the system the system 100 and accessed through the delivery network 2 (112).

Figure 2:
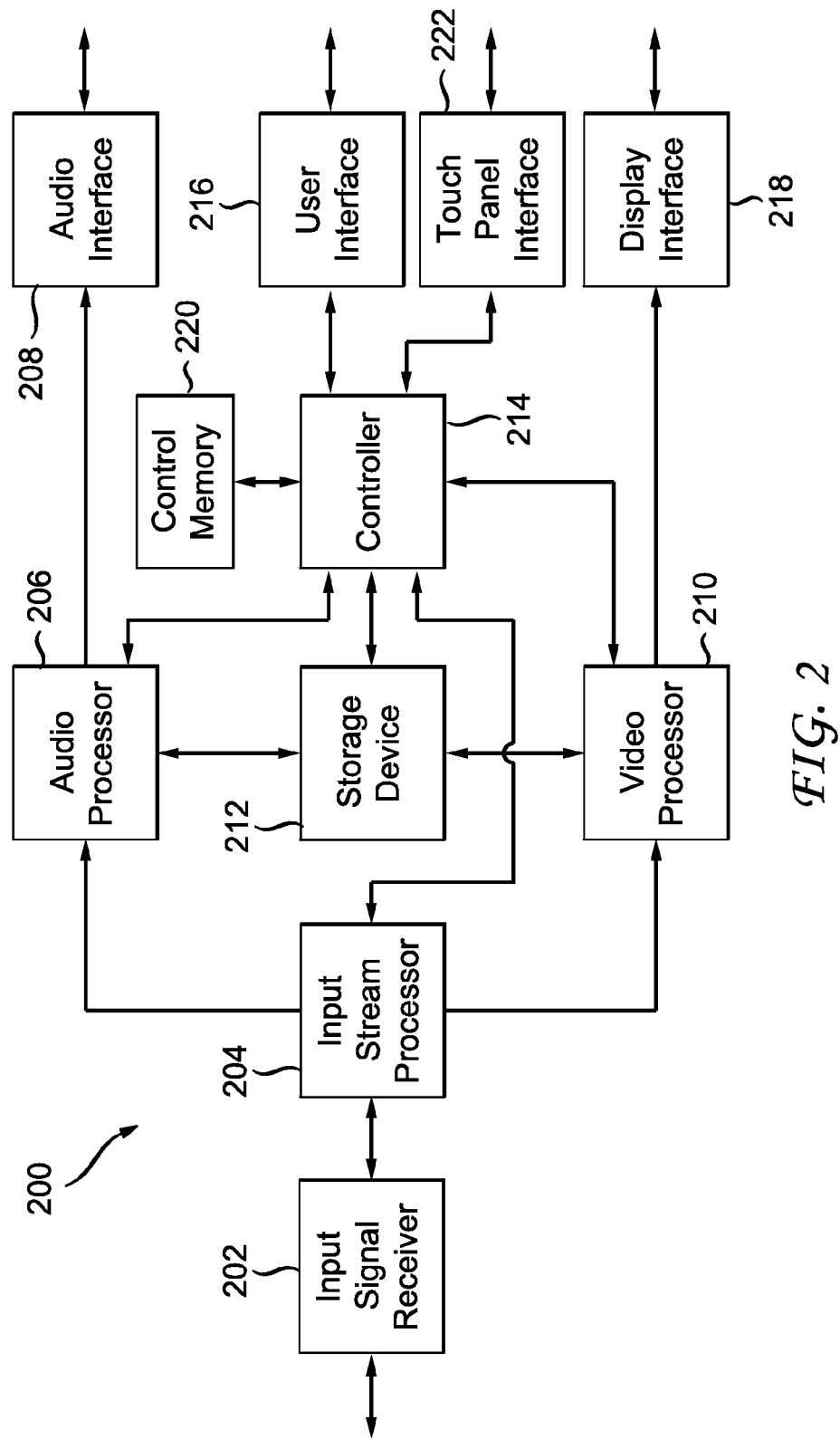
FIG. 2 is a block diagram of an exemplary set-top box/digital video recorder (DVR) in accordance with the present disclosure.

Turning now to FIG. 2, a block diagram of an embodiment of a media device 200 is shown. Receiving device 200 may operate similar to the media device described in FIG. 1 and may be included as part of a gateway device, modem, set-top box, or other similar communications device. The device 200 shown may also be incorporated into other systems including an audio device or a display device. In either case, several components necessary for complete operation of the system are not shown in the interest of conciseness, as they are well known to those skilled in the art.

In the device 200 shown in FIG. 2, the content is received by an input signal receiver 202. The input signal receiver 202 may be one of several known receiver circuits used for receiving, demodulation, and decoding signals provided over one of the several possible networks including over the air, cable, satellite, Ethernet, fiber and phone line networks. The desired input signal may be selected and retrieved by the input signal receiver 202 based on user input provided through a control interface or touch panel interface 222. Touch panel interface 222 may include an interface for a touch screen device. Touch panel interface 222 may also be adapted to interface to a cellular phone, a tablet, a mouse, a high end remote or the like.

The decoded output signal is provided to an input stream processor 204. The input stream processor 204 performs the final signal selection and processing, and includes separation of video content from audio content for the content stream. The audio content is provided to an audio processor 206 for conversion from the received format, such as compressed digital signal, to an analog waveform signal. The analog waveform signal is provided to an audio interface 208 and further to the display device or audio amplifier. Alternatively, the audio interface 208 may provide a digital signal to an audio output device or display device using a High- Definition Multimedia Interface (HDMI) cable or alternate audio interface such as via a Sony/Philips Digital Interconnect Format (SPDIF). The audio interface may also include amplifiers for driving one more sets of speakers. The audio processor 206 also performs any necessary conversion for the storage of the audio signals.

The video output from the input stream processor 204 is provided to a video processor 210. The video signal may be one of several formats. The video processor 210 provides, as necessary a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., navigation instructions such as fast-forward (FF) and rewind (Rew), received from a user interface 216 and/or touch panel interface 222. The storage device 212 may be a hard disk drive, one or more large capacity integrated electronic memories, such as static RAM (SRAM), or dynamic RAM (DRAM), or may be an interchangeable optical disk storage system such as a compact disk (CD) drive or digital video disk (DVD) drive.

The converted video signal, from the video processor 210, either originating from the input or from the storage device 212, is provided to the display interface 218. The display interface 218 further provides the display signal to a display device of the type described above. The display interface 218 may be an analog signal interface such as red-green-blue (RGB) or may be a digital interface such as HDMI. It is to be appreciated that the display interface 218 will generate the various screens for presenting the search results in a three dimensional gird as will be described in more detail below.

The controller 214 is interconnected via a bus to several of the components of the device 200, including the input stream processor 202, audio processor 206, video processor 210, storage device 212, and a user interface 216. The controller 214 manages the conversion process for converting the input stream signal into a signal for storage on the storage device or for display. The controller 214 also manages the retrieval and playback of stored content. Furthermore, as will be described below, the controller 214 performs searching of content and the creation and adjusting of the gird display representing the content, either stored or to be delivered via the delivery networks, described above.

The controller 214 is further coupled to control memory 220 (e.g., volatile or nonvolatile memory, including RAM, SRAM, DRAM, ROM, programmable ROM (PROM), flash memory, electronically programmable ROM (EPROM), electronically erasable programmable ROM (EEPROM), etc.) for storing information and instruction code for controller 214. Control memory 220 may store instructions for controller 214. Control memory may also store a database of elements, such as graphic elements containing content, various graphic elements used for generating a displayed user interface for display interface 218, and the like. Alternatively, the memory may store the graphic elements in identified or grouped memory locations and use an access or location table to identify the memory locations for the various portions of information related to the graphic elements. In addition, various graphic elements can be generated in response to computer instructions interpreted by controller 214 for output to display interface 218. Additional details related to the storage of the graphic elements will be described below. Further, the implementation of the control memory 220 may include several possible embodiments, such as a single memory device or, alternatively, more than one memory circuit communicatively connected or coupled together to form a shared or common memory. Still further, the memory may be included with other circuitry, such as portions of bus communications circuitry, in a larger circuit.

Optionally, controller 214 can be adapted to extract metadata from audio and video media by using audio processor 206 and video processor 210, respectively. That is, metadata that is contained in video signal in the vertical blanking interval, auxiliary data fields associated with video, or in other areas in the video signal can be harvested by using the video processor 210 with controller 214 as to generate metadata that can be used for functions such as generating an electronic program guide, have descriptive information about received video, supporting an auxiliary information service, and the like. Similarly, the audio processor 206 working with controller 214 can be adapted to recognize audio watermarks that may be in an audio signal. Such audio watermarks can then be used to perform some action such as the recognition of the audio signal, security which identifies the source of an audio signal, or perform some other service. Furthermore, metadata to support the actions listed above can come from a network source which are processed by controller 214.

Figure 3:
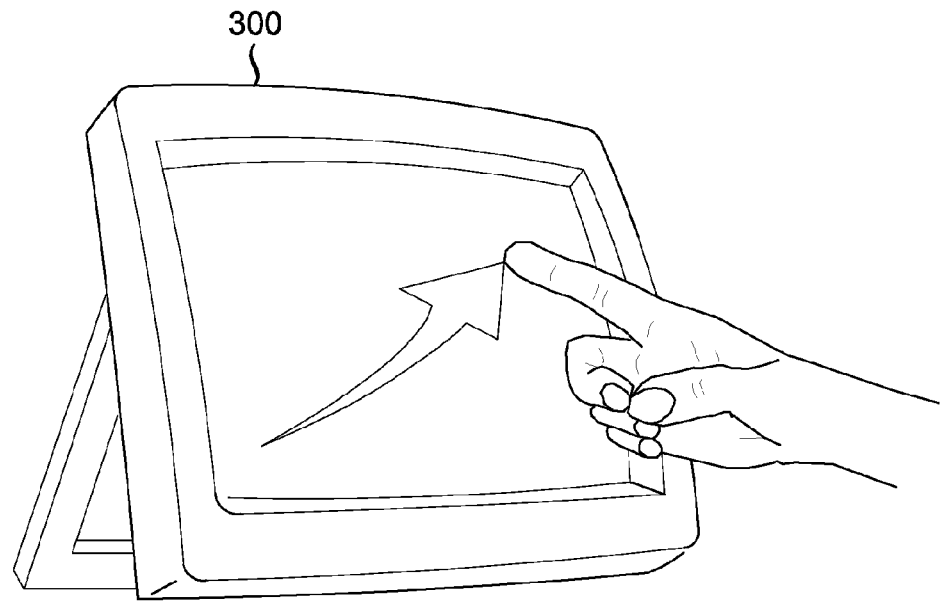
FIG. 3 is a perspective view of an exemplary display device in accordance with an embodiment of the present disclosure.

Turning now to FIG. 3, the user interface process of the present disclosure employs an input device that can be used to express functions, such as fast forward, rewind, etc. To allow for this, a tablet or touch panel device 300 (which is the same as the touch screen device 116 shown in FIG. 1 and/or is an integrated example of media device 108 and touch screen device 116) may be interfaced via the user interface 216 and/or touch panel interface 222 of the receiving device 200. The touch panel device 300 allows operation of the receiving device or set top box based on hand movements, or gestures, and actions translated through the panel into commands for the set top box or other control device. In one embodiment, the touch panel 300 may simply serve as a navigational tool to navigate the grid display. In other embodiments, the touch panel 300 will additionally serve as the display device allowing the user to more directly interact with the navigation through the grid display of content. The touch panel device may be included as part of a remote control device containing more conventional control functions such as activator buttons. The touch panel 300 can also includes at least one camera element. As described in further detail below, content displayed on the touch panel device 300 may be zapped or thrown to the main screen (e.g., display device 114 shown in FIG. 1).

Figure 4:
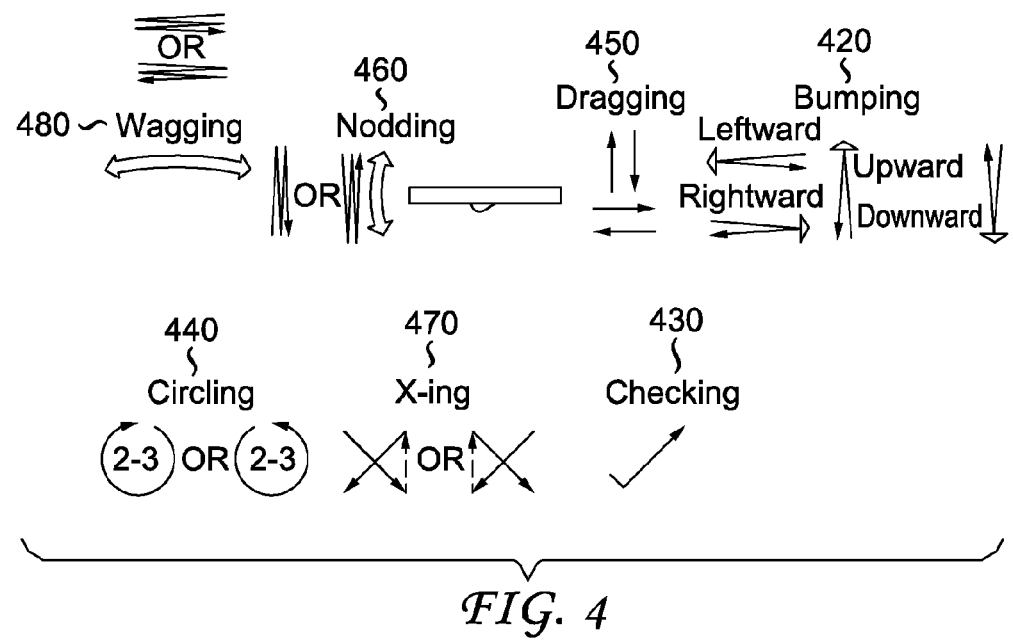
FIG. 4 illustrates an exemplary embodiment of the use of a gestures for a sensing controller or touch screen in accordance with the present disclosure.

Turning now to FIG. 4, the use of a gesture sensing controller or touch screen, such as shown, provides for a number of types of user interaction. The inputs from the controller are used to define gestures and the gestures, in turn, define specific contextual commands. The configuration of the sensors may permit defining movement of a user's fingers on a touch screen or may even permit defining the movement of the controller itself in either one dimension or two dimensions. Two-dimensional motion, such as a diagonal, and a combination of yaw, pitch and roll can be used to define any four-dimensional motion, such as a swing. A number of gestures are illustrated in FIG. 4. Gestures are interpreted in context and are identified by defined movements made by the user.

Bumping 420 is defined by a two-stroke drawing indicating pointing in one direction, either up, down, left or right. The bumping gesture is associated with specific commands in context. For example, in a TimeShifting mode, a left-bump gesture 420 indicates rewinding, and a right-bump gesture indicates fast-forwarding. In other contexts, a bump gesture 420 is interpreted to increment a particular value in the direction designated by the bump. Checking 440 is defined as in drawing a checkmark. It is similar to a downward bump gesture 420. Checking is identified in context to designate a reminder, user tag or to select an item or element. Circling 440 is defined as drawing a circle in either direction. It is possible that both directions could be distinguished. However, to avoid confusion, a circle is identified as a single command regardless of direction. Dragging 450 is defined as an angular movement of the controller (a change in pitch and/or yaw) while pressing a button (virtual or physical) on the tablet 300 (i.e., a "trigger drag"). The dragging gesture 450 may be used for navigation, speed, distance, time-shifting, rewinding, and forwarding. Dragging 450 can be used to move a cursor, a virtual cursor, or a change of state, such as highlighting outlining or selecting on the display. Dragging 450 can be in any direction and is generally used to navigate in two dimensions. However, in certain interfaces, it is preferred to modify the response to the dragging command. For example, in some interfaces, operation in one dimension or direction is favored with respect to other dimensions or directions depending upon the position of the virtual cursor or the direction of movement. Nodding 460 is defined by two fast trigger-drag up-and-down vertical movements. Nodding 460 is used to indicate "Yes" or "Accept." X-ing 470 is defined as in drawing the letter "X." X-ing 470 is used for "Delete" or "Block" commands. Wagging 480 is defined by two trigger-drag fast back-and-forth horizontal movements. The wagging gesture 480 is used to indicate "No" or "Cancel."

Depending on the complexity of the sensor system, only simple one dimensional motion or gestures may be allowed. For instance, a simple right or left movement on the sensor as shown here may produce a fast forward or rewind function. In addition, multiple sensors could be included and placed at different locations on the touch screen. For instance, a horizontal sensor for left and right movement may be placed in one spot and used for volume up and down, while a vertical sensor for up down movement may be place in a different spot and used for channel up and down. In this way specific gesture mappings may be used. A two finger swipe gesture may be utilized to initiate the throwing or moving of content from the tablet 300 to the main screen or display device 114.

Figure 5:
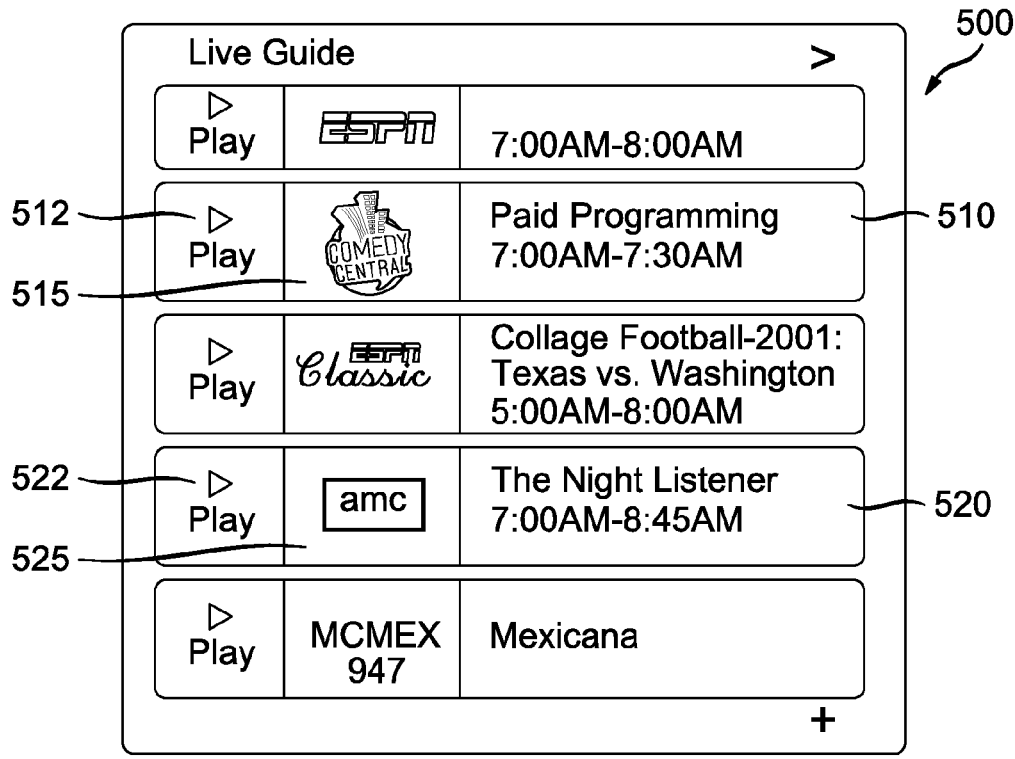
FIG. 5 illustrates an exemplary embodiment of a first card user interface of the present disclosure.

FIG. 5 illustrates an exemplary embodiment of a window interface known as a card, where various applications are presented within such a card interface. For example, live television guide application that represents different television listings are presented within card interface 500. That is, the card functions as a window that displays a representation of the application being run. Such cards can be presented on a device including a tablet, a media player, a phone, a monitor, a computer, and any other device that has a display. Cards can represent different applications such as electronic program guides, playlists, social media interfaces, games, video, audio, web pages, browsers, rendered media services, and the like.

Returning to card interface 500, cell 510 displays information about a television show, in this example an infomercial, being broadcasted on a broadcast channel called Comedy Central. Play control 512 when activated using a gesture will cause a tuner in a device such as a set top box, tablet, television, and the like, to tune to a requested channel. Graphic 515 such as a logo comports to the broadcast channel that can be tuned to by activating play control 512. Cell 520 displays information for a television show called The Night Listener which is being broadcasted on American Movie Classics (AMC) which is indicated by graphic 525. If a user wants to tune to AMC, play control 522 can be activated with a gesture. The result of the activation of play controls 512, 522 leads to the outputting of a tuned channel to a display or recording device.

Figure 6:
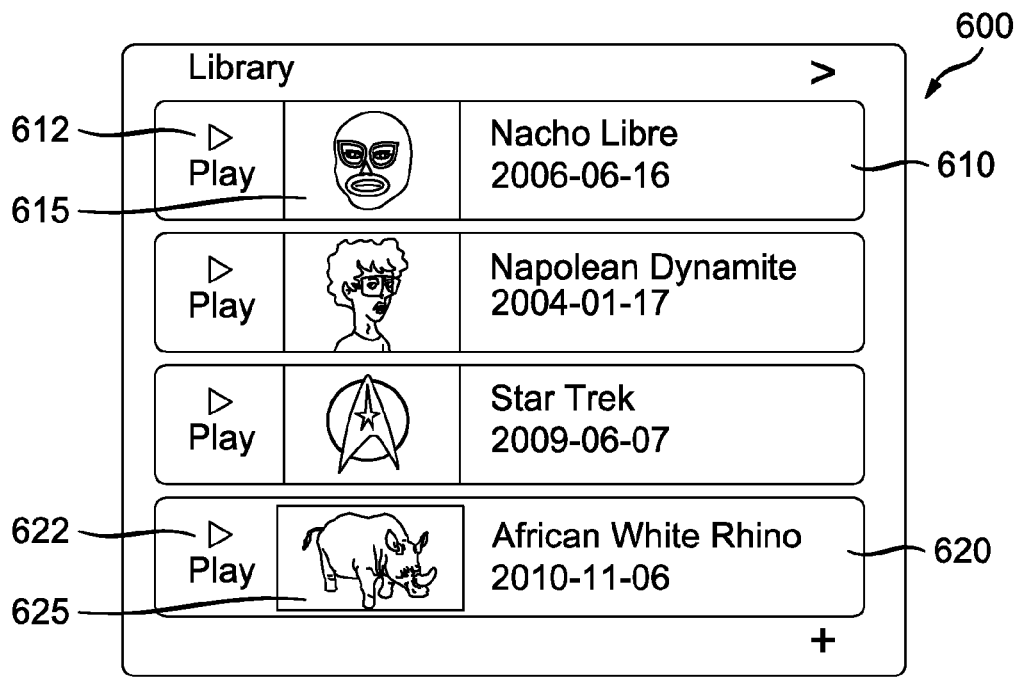
FIG. 6 illustrates an exemplary embodiment of a second card user interface of the present disclosure.

FIG. 6 is an exemplary embodiment of a card interface 600 for another application that represents different media assets (video, audio, pictures, and the like) that are available for playback. Specifically, such media assets can be stored in a content source such as local storage medium, a remote storage medium, an on-demand media service such as video on demand, over the top media service, and the like, where a media asset is delivered to a media device when requested. For example, in response to the activation of play control 612, the media asset Nacho Libre as indicated by cell 610 can be played back using the exemplary architecture as described for FIG. 1. Similarly, a media asset identified as African White Rhino in cell 620 can be played when play control 622 is activated with a gesture.

Graphics 612 and 625 represent thumbnails, poster art, logo, icon, and the like that are used to identify a media asset whereby graphic 612 represents Nacho Libre while graphic element 625 represents African White Rhino. Such graphics can be linked to a media asset by an association made by a user, program guide information that specifies a particular graphic, a screenshot from a media file, and the like.

Figure 7:
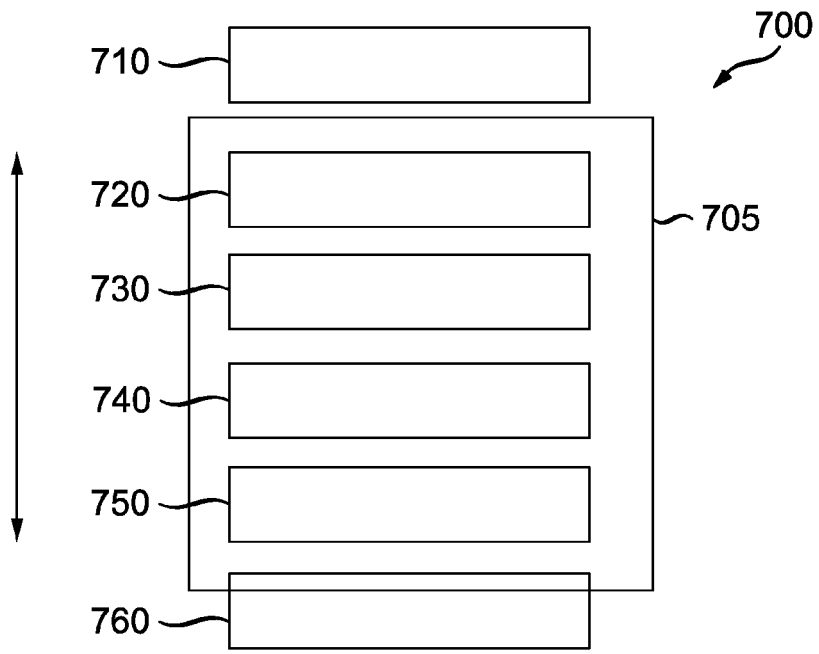
FIG. 7 illustrates an exemplary embodiment of a first manipulation of a card user interface of the present disclosure.

FIG. 7 is an exemplary embodiment of a card interface 700 that is manipulated by a gesture or an action by an input device. Card interface 700 has a display area 705 which is the part of the card or window that can be viewed. Sometimes there may be more elements where a card may have more elements than can be displayed in display area 705 at one time. For example, cell 710 is not displayed for card interface 700 while cells 720, 730, 740, 750, and part of cell 760 are viewable in display area 705.

Figure 8:
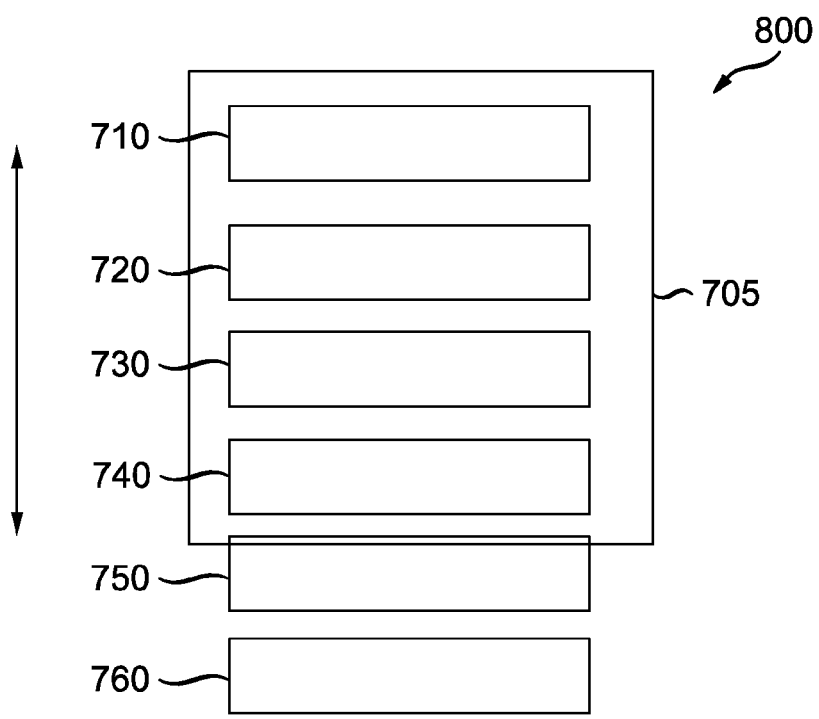
FIG. 8 illustrates an exemplary embodiment of an second manipulation of a card interface of the present disclosure.

Cards can be manipulated in a vertical direction using a gesture or control input, where cells that are displayed are capable of being shown in response to such a gesture of control in an up or down motion. When card interface 800 from FIG. 8 is subjected to a downward gesture and/or control input, as an manipulation, display area 705 will show cell 710, while cell 760 is moved down so far as not to be viewable. Likewise part of cell 750 is not displayed in response to the downward gesture/control input. Cells 750 and 760 can be viewed again in display area 705 if one operates card interface 800 in an upward gesture, as a manipulation, to yield the arrangement of cells shown in card interface 700.

Figure 9:
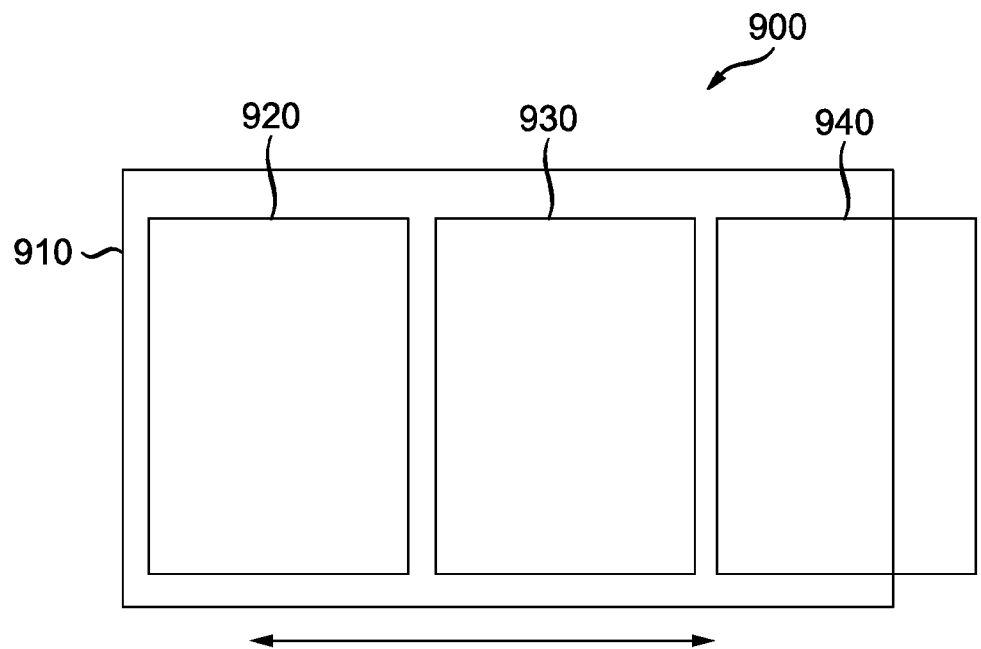
FIG. 9 illustrates an exemplary embodiment of a first manipulation of multiple card interfaces when present on a display device in accordance with the present disclosure.
Figure 10:
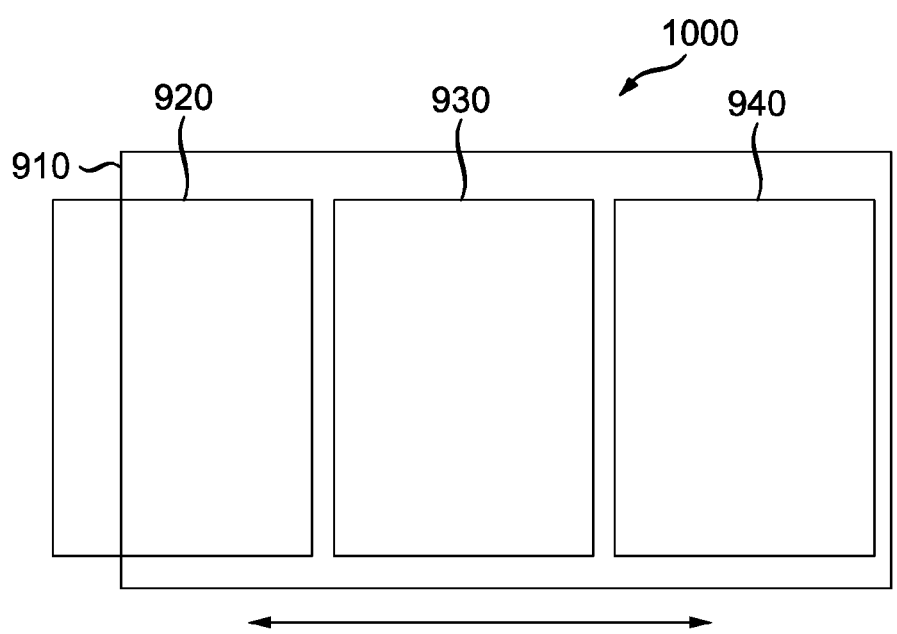
FIG. 10 illustrates an exemplary embodiment of a second manipulation of multiple card interfaces when present on a display device in accordance with the present disclosure.

FIG. 9 is an exemplary embodiment of user interface 900 of a device that presents multiple card interfaces. In this illustrative embodiment, display area 910 displays multiple cards 920, 930, and 940 which can be manipulated in a horizontal direction in response to a gesture and/or control input, where part of card 940 is not displayed in display area 910. If one manipulates display area 910 towards the left with a gesture/control input, the result is shown in FIG. 10 for user interface 1000 where card 940 is completely shown in display area 910 while part of card 920 is not displayed. If one were to move display area 910 to the right with a gesture/control input, the result is shown in FIG. 9, where card 920 is completely shown in display area 910 while part of card 940 is not displayed.

Figure 11:
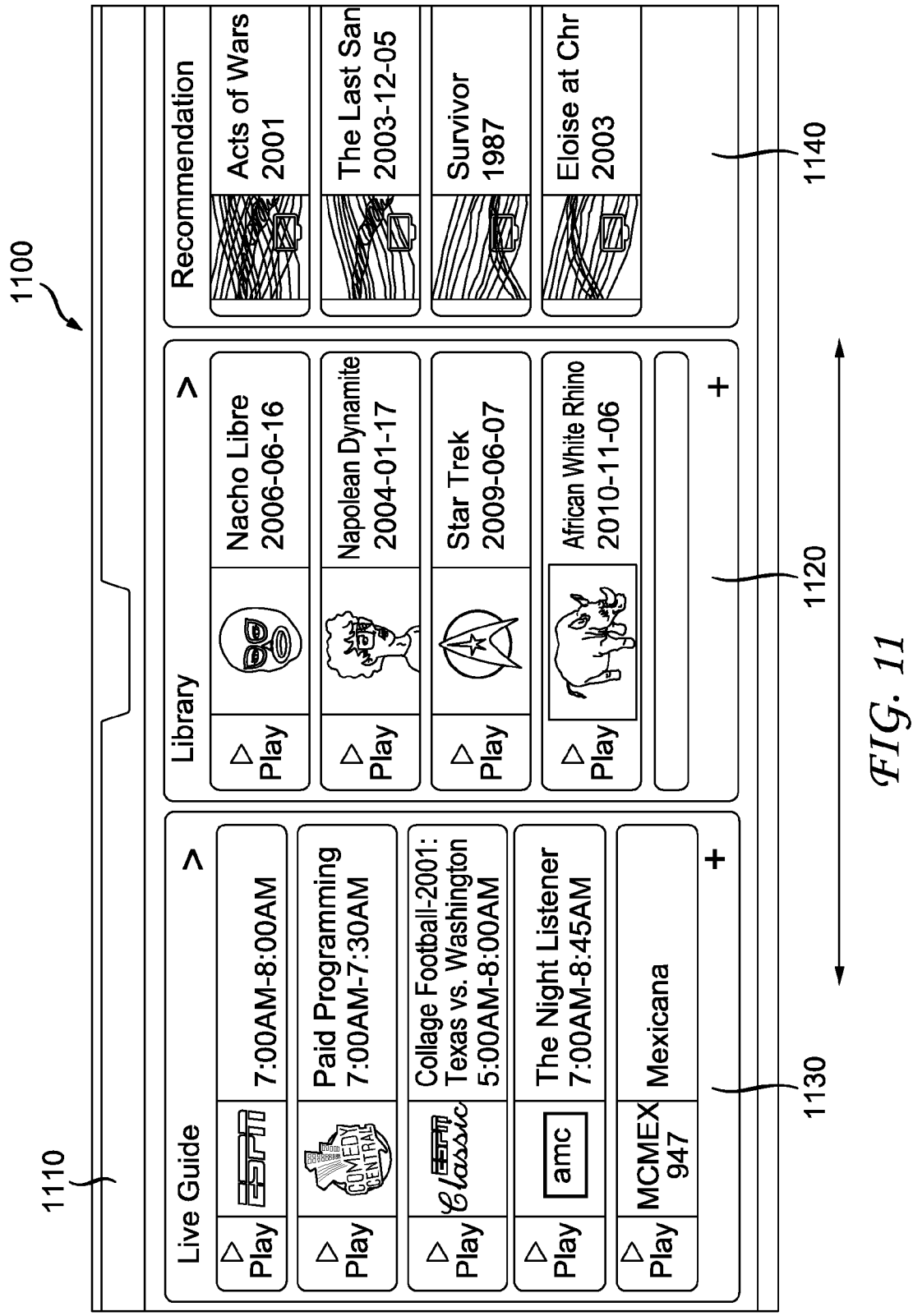
FIG. 11 illustrates an exemplary embodiment of a first manipulation of multiple card interfaces when present on a display device in accordance with the present disclosure.
Figure 12:
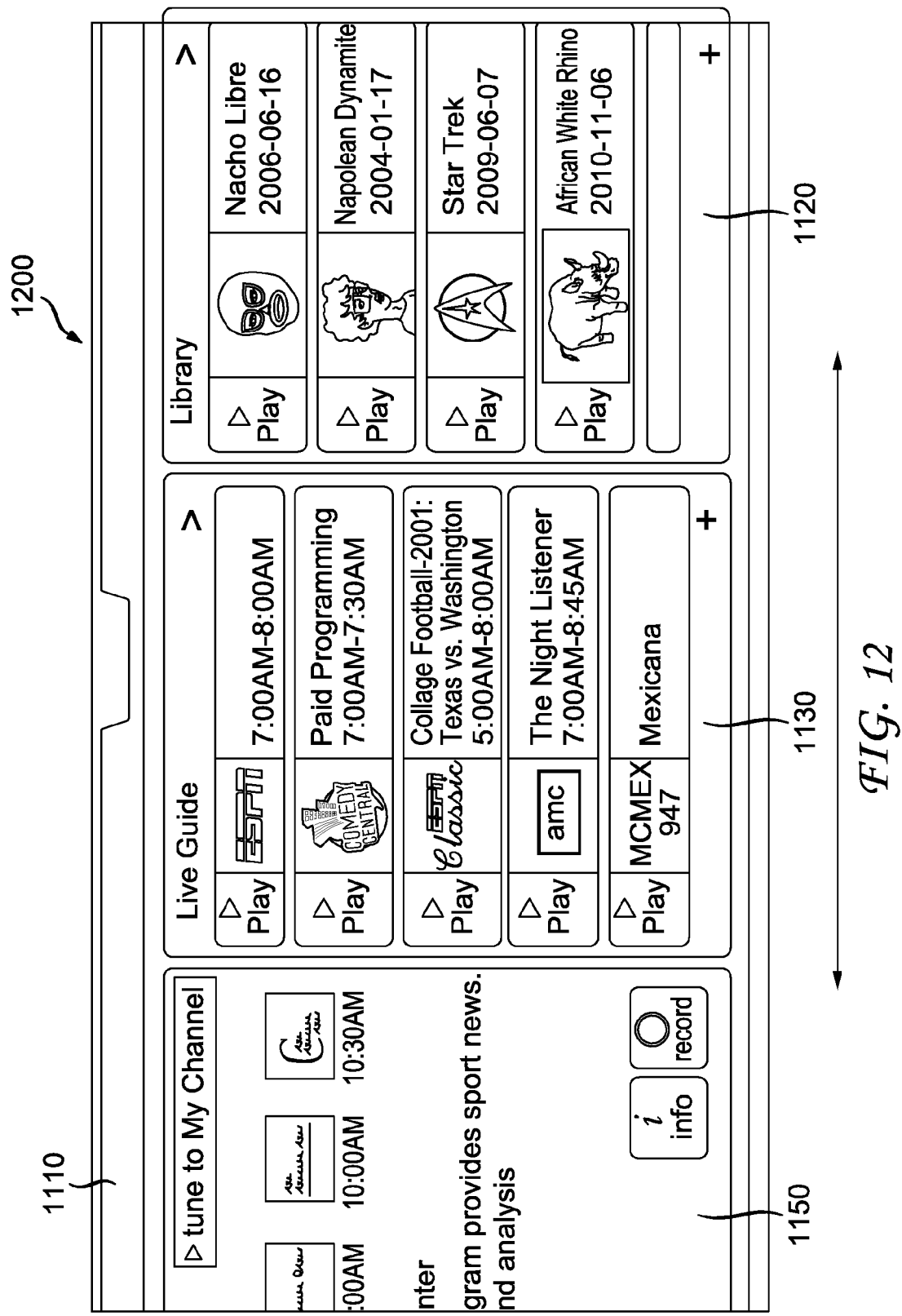
FIG. 12 illustrates an exemplary embodiment of second manipulation of multiple card interfaces when present on a display device in accordance with the present disclosure.

FIG. 11 displays an alternative embodiment of a multiple card interfaces shown in user interface 1100 that is subjected to a manipulation. Specifically, cards 1120, 1130, and 1140, are shown in display area 1110. These cards in response to a gesture/control input in the right direction will result in user interface 1200 shown in FIG. 12. That is, user interface 1200 shows that cards 1120 and 1130 are moved to the right, as to show a new card 1150 in display area 1110. If display area 1110 in FIG. 12 is moved to the left in response to a gesture/control interface, card 1150 will not be displayed while card 1120 becomes visible in display area 1110 as shown in FIG. 11.

Figure 13:
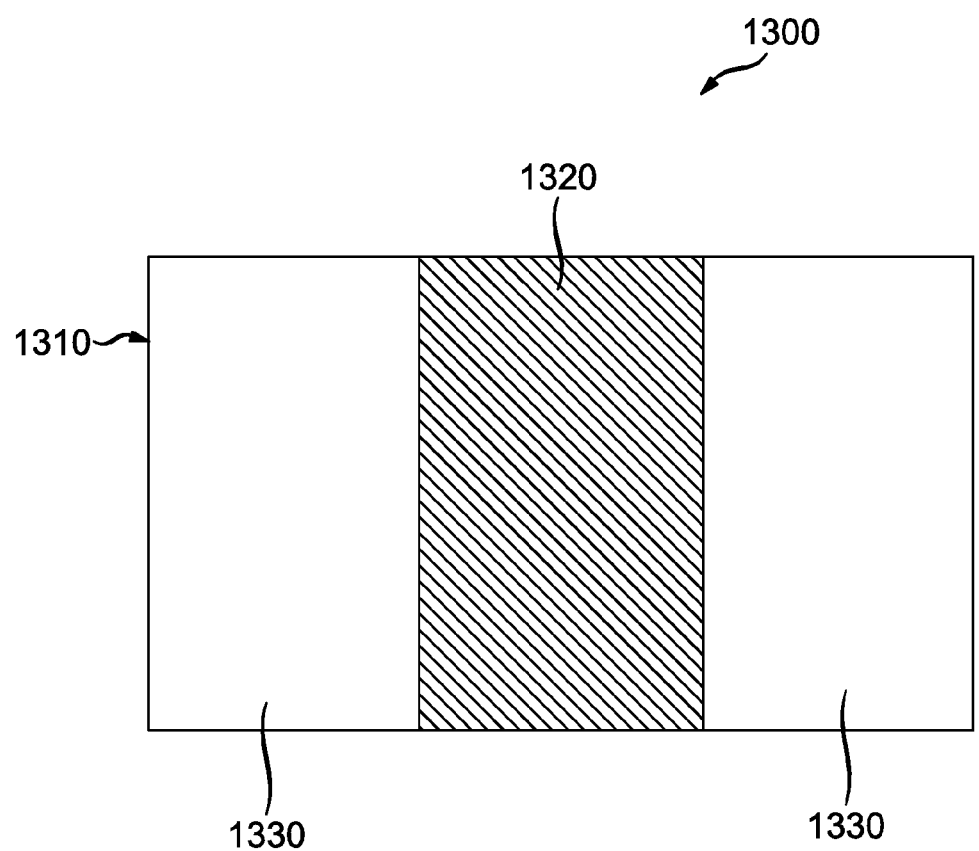
FIGS. 13 and 14 illustrate exemplary embodiments of the placement of a locked zone in a display area in accordance with the present disclosure.

FIG. 13 displays an illustrative embodiment of implementing a locked zone feature in accordance with the presented principles. A locked zone is a region selected by a user where various cards or windows overlapping that region are capable of being manipulated in certain ways, while cards not overlapping that region are restricted. It is intended that a card will not be restricted if part of the card resides over the locked zone, although the principles of disclosure can also be implemented where a card must completely reside in a locked zone in order to be able to be manipulated.

Figure 14:
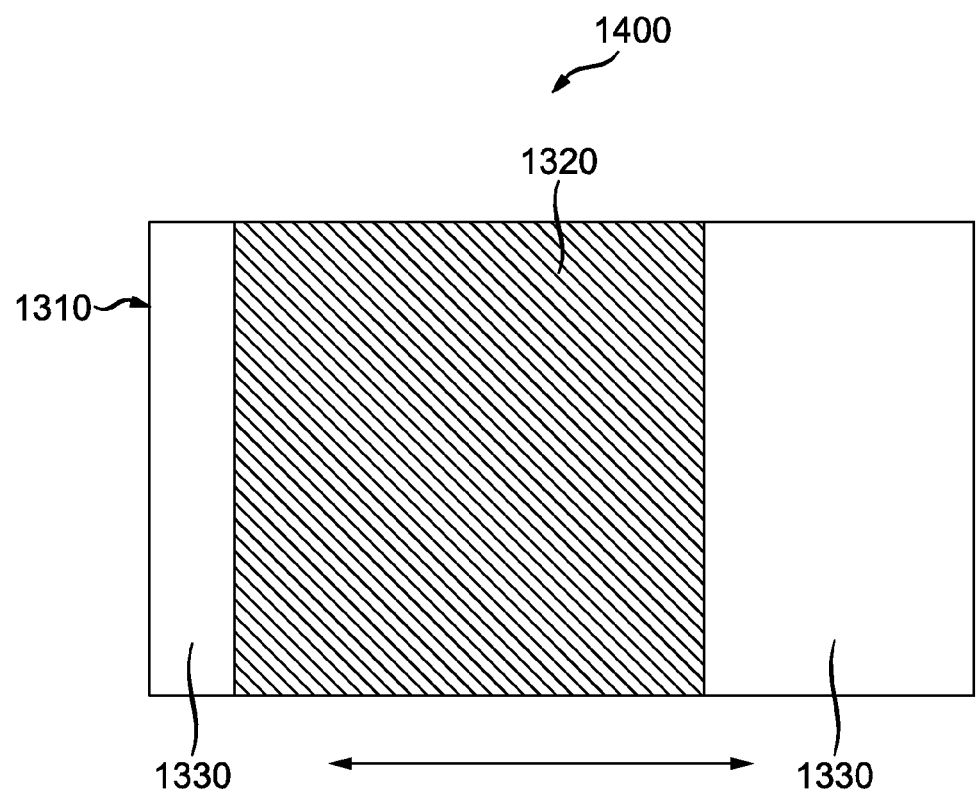

In the present illustration 1300, a display area 1310 has locked zone 1320 in the center while areas 1330 are regular zones and at the edges of display area 1310. FIG. 14 shows a user interface 1400 where locked zone 1320 was expanded in a vertical direction in response to a gesture/control interface activated by a user. Also in response to the user action, regular zones 1330 were reduced in area. Likewise, a locked zone 1320 can also be reduced in response to gesture/control interface activated by a user, whereby regular zones 1330 can be expanded. The detection of overlapping cards and regions are capable of being performed using typical video detection techniques. In addition, controller 214 when outputting a video signal would recognize the location of objects in the video signal that is generated.

It is noted, that locked zone 1320 does not need to be always rendered in a displayed area 1310. That is, when a user is resizing locked zone 1320 in response to a gesture/input signal, locked zone 1320 can be displayed for the duration of such a resizing operation. After the resizing operation is completed, the background of display area 1310 returns to normal, even though the locked zone 1320 is still present. Alternatively, locked zoned 1320 can always be displayed as part of display area 1310 in a form as shown in FIGS. 13 and 14.

Figure 15:
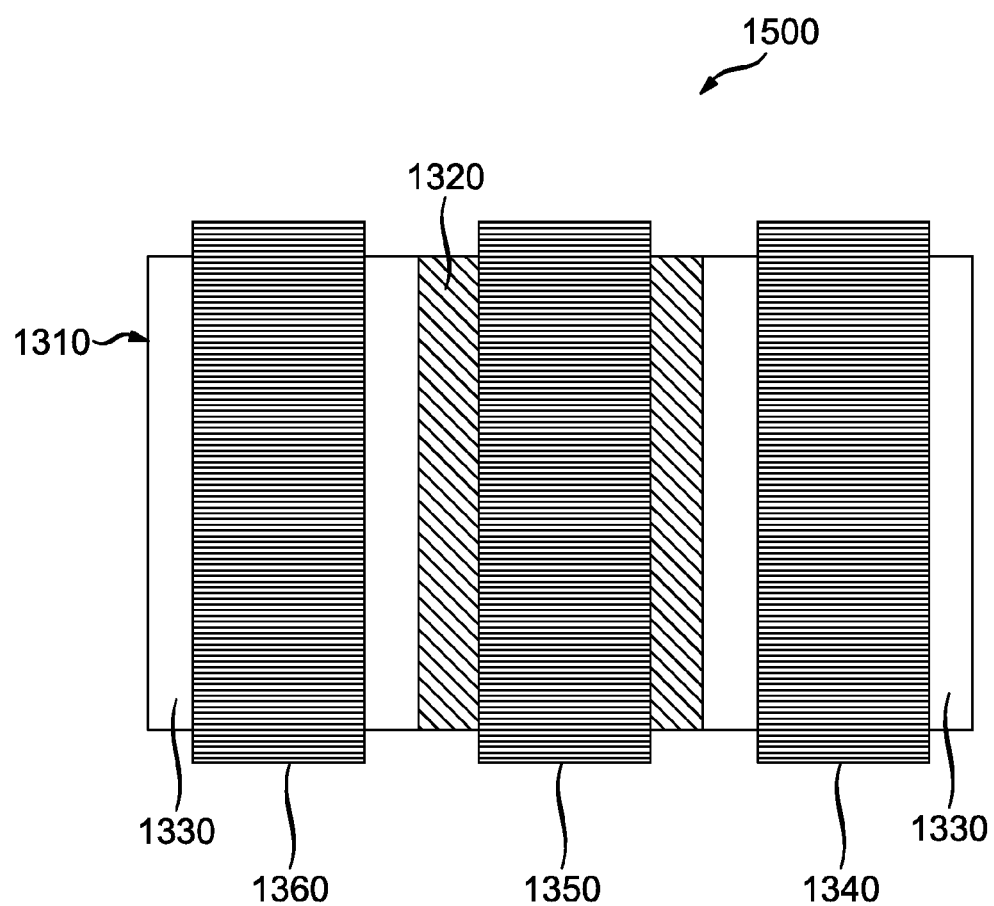
FIGS. 15-17 illustrate exemplary embodiments of the operation of a locked zone in restricting the manipulation of multiple cards in accordance with the present disclosure.
Figure 16:
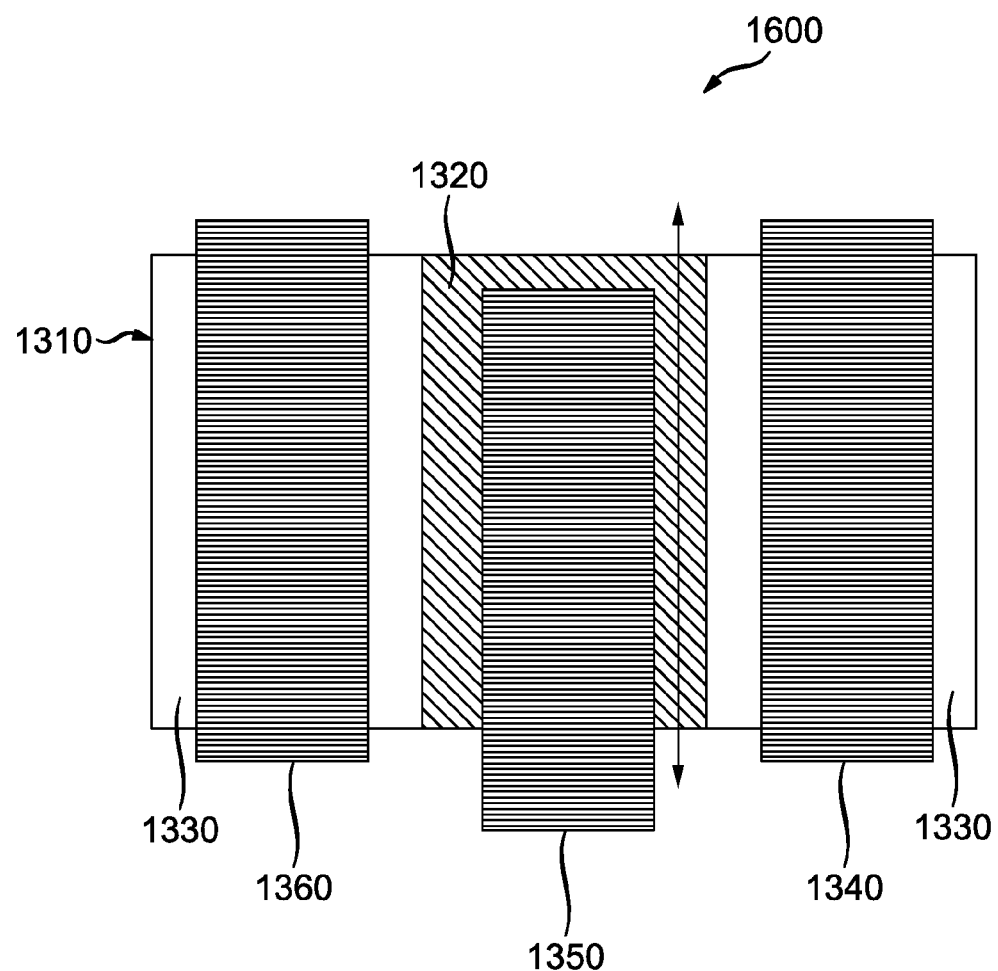

FIG. 15 presents an embodiment of a user interface 1500 with three cards 1340, 1350, and 1360 which occupy display area 1310. In this example, cards 1340 and 1360 occupy regular zones 1330, while card 1350 overlaps locked zone 1320. Card 1350 can be moved in a down direction as shown in FIG. 16 and/or in an up position. In contrast, cards 1350 and 1370 are restricted in being moved in a vertical direction, because these cards are locked in position by occupying regions 1330.

Figure 17:
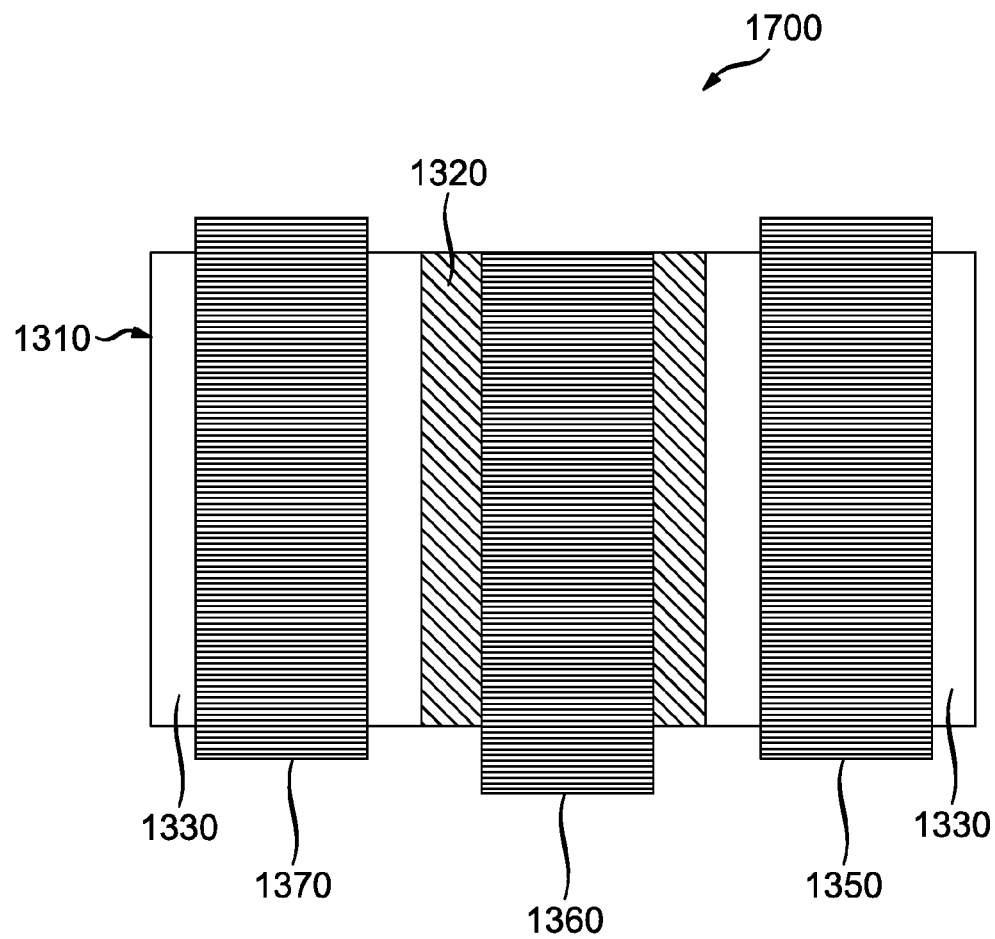

FIG. 17 illustrates an exemplary embodiment of a user interface 1700 where cards can still be moved in a horizontal direction as shown where cards 1350 and 1360 are moved towards the right. Hence, by occupying locked zone 1320, card 1360 can now be moved in an up direction, new card 1370 and card 1350 are restricted from being moved in a vertical direction.

Figure 18:
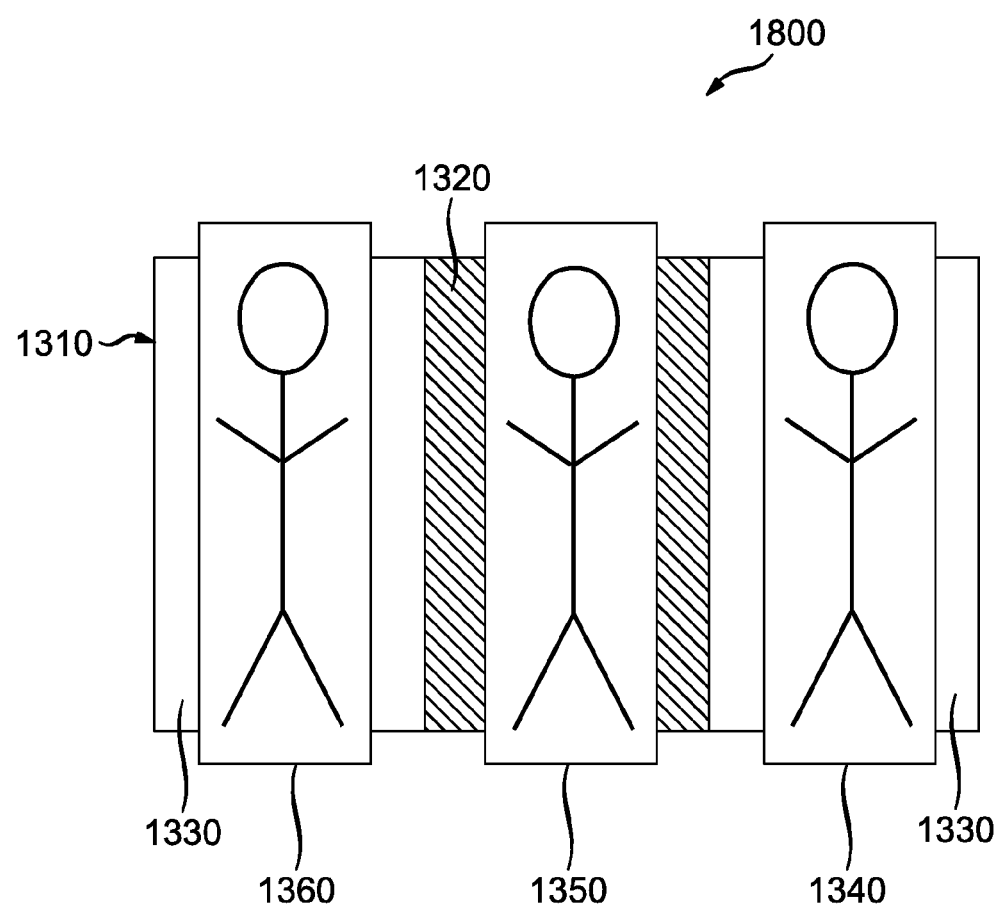
FIGS. 18-20 illustrate exemplary embodiments of restricting the effect of a command for cards that do not reside in a locked zone in accordance with the present disclosure.
Figure 19:
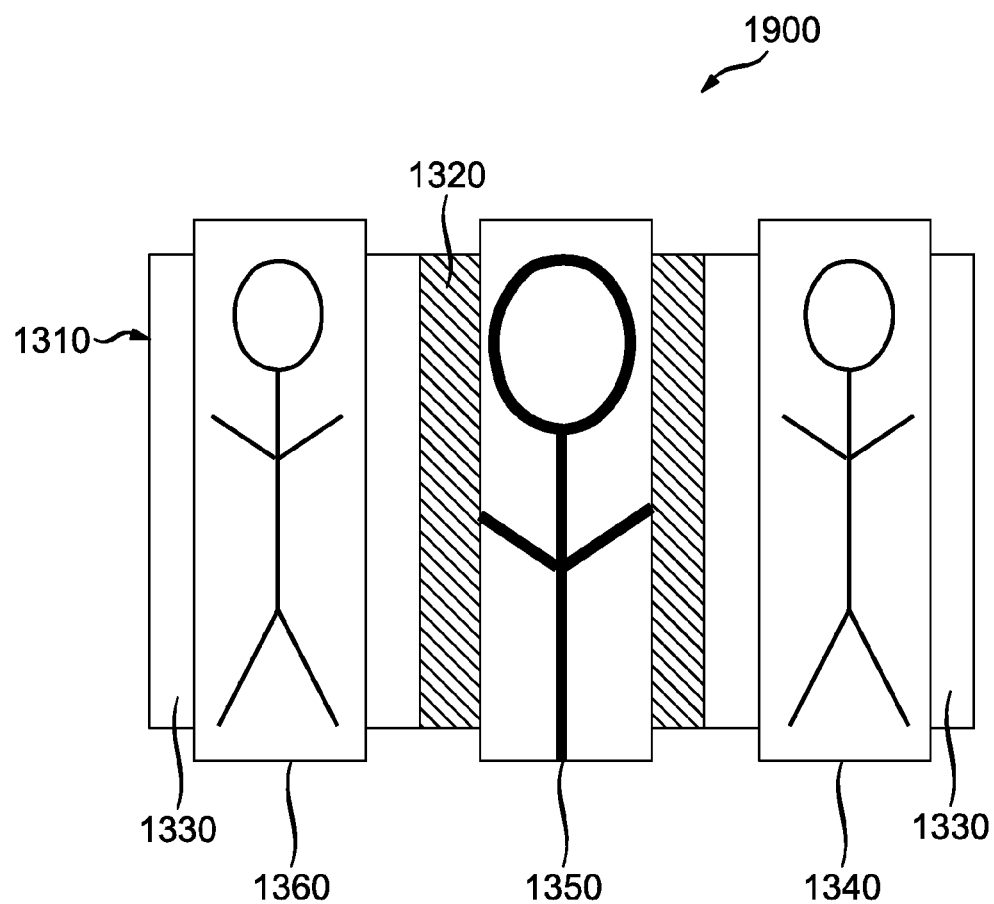
Figure 20:
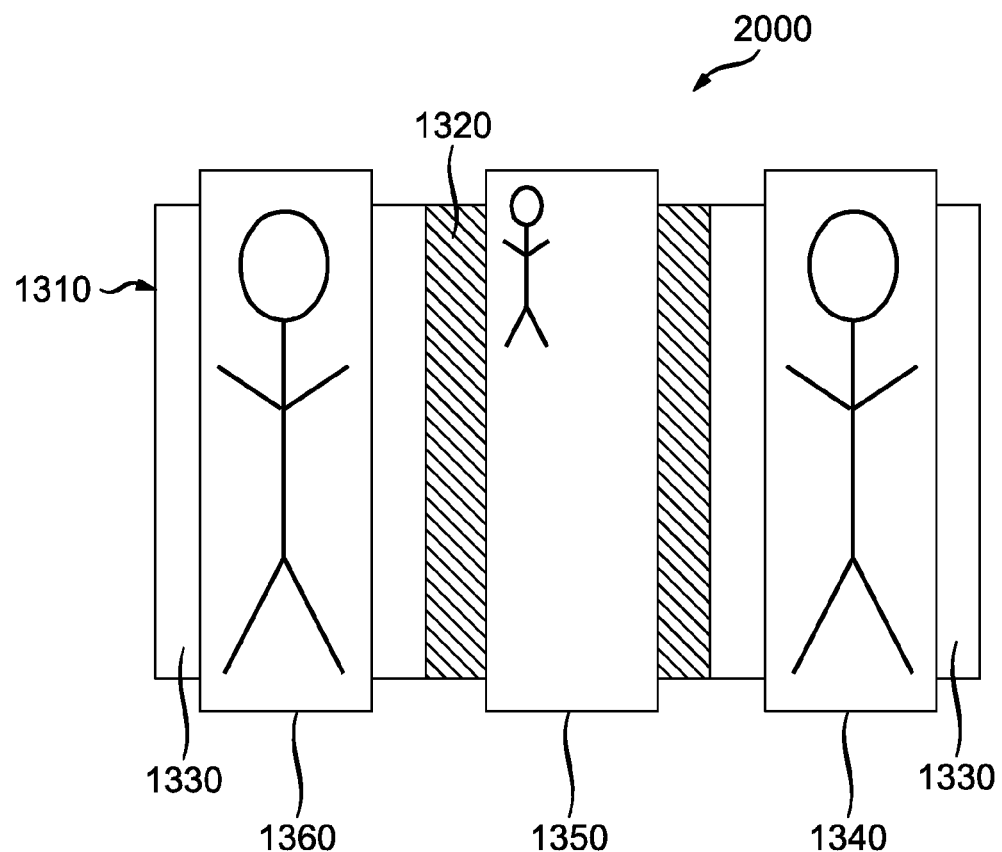

FIGS. 18-20 also demonstrate an alternative embodiment of the use of the locked zone feature. In FIG. 18, an exemplary embodiment of the disclosure as a user interface 1900 is shown where cards 1340, 1350, and 1360 show a graphic. Cards 1340 and 1360 occupy regular zones 1330, while card 1350 is shown as residing over locked zone 1320.

When an enlarge/zoom function gesture/control input is applied to a device, the results are shown in FIG. 19 which represents an exemplary embodiment 1900 of a user interface. By occupying locked zone 1320, card 1350 has the graphic shown expanded in response to the zoom command, while cards 1340 and 1360 stay the same size.

FIG. 20 of an illustrative embodiment 2000 shows the results of a minimize/reduce command in response to a gesture/control input where by occupying locked zone 1320, card 1350 has the displayed graphic reduced in size. Cards 1340 and 1360 again stay the same size in response to the minimize command because such cards overlay regular zones 1330. Other commands can be utilized where only cards residing in a locked zone are affected by such commands including color correction, cropping of a graphics, selection of areas for a cut/paste operation, and the like.

Figure 21:
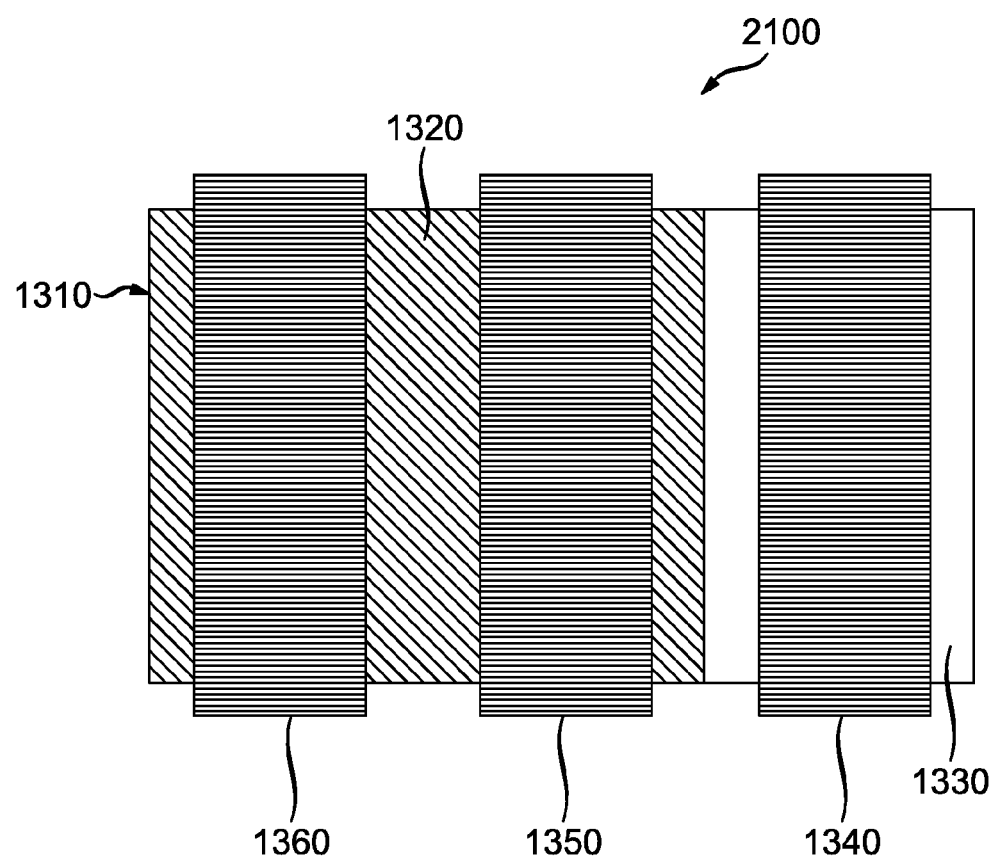
FIGS. 21-22 illustrate exemplary embodiments of having several cards overlaying a locked zone in accordance with the present disclosure.
Figure 22:
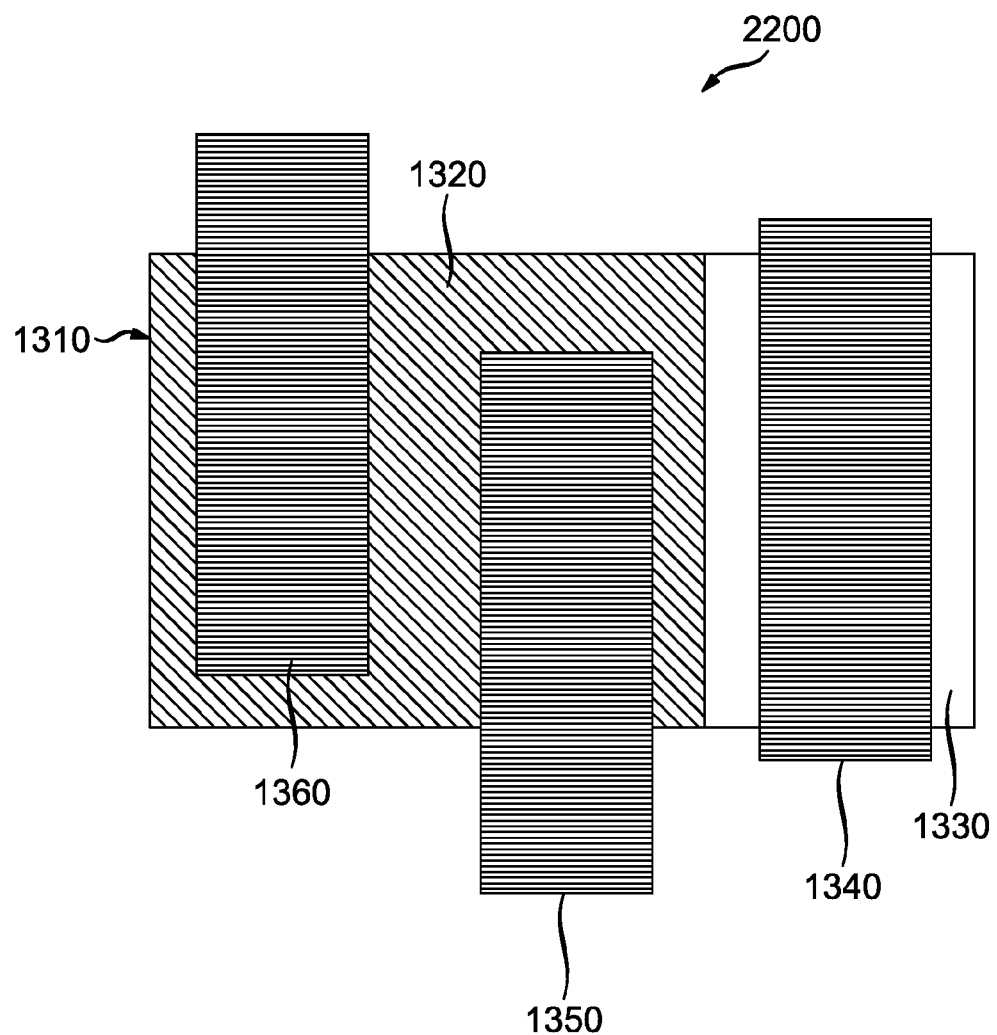

FIGS. 21 and 22 demonstrate user interfaces where several card interfaces occupy a locked zone. Specifically, FIG. 21 is a view of a user interface 2100 that has two cards 1350 and 1360 occupying locked zone 1320. In contrast, card 1340 is situated over regular zone 1330. In this configuration, cards 1350 and 1360 may be manipulated in a vertical direction as shown in user interface 2200 in FIG. 22, while card 1340 cannot be manipulated in an up/down direction. Cards 1340, 1350, and 1360 however can still be moved in a horizontal direction regardless of whether the cards reside over a locked zone or regular zone.

Figure 23:
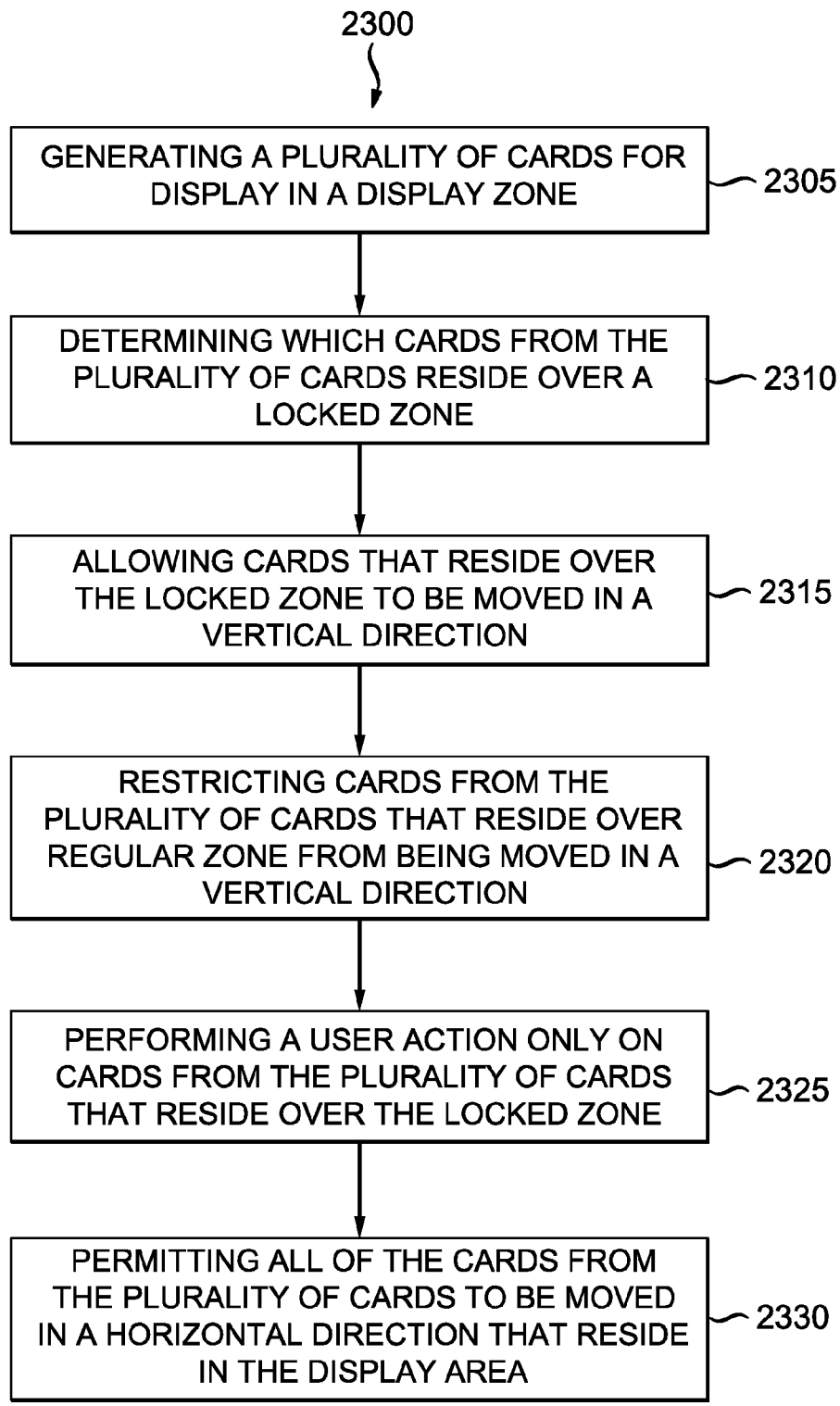
FIG. 23 presents a flow chart for determining cards to be restricted from movement in a user interface in accordance with the present disclosure.

FIG. 23 presents a flow chart 2300 for determining cards to be restricted from movement in a user interface in accordance with the present disclosure. Method step 2305 is for generating a plurality of cards/windows for display in a display zone. The generation of the cards can be done in accordance with the description described above for FIGS. 5-12, in other places in the specification, as in accordance with the described principles herein.

Step 2310 determines which cards from the plurality of cards that are in display zone in a locked zone. This step determine which cards are going to be able to be manipulated by a user in response to a user gesture/command while other cards which reside in the regular zone will not be affected by the user instruction. As explained earlier, it is expected that sometimes cards will partially reside over a locked zone and other parts of the card reside over a regular zone, whereby a decision can be made to treat cards that have any part of such cards reside over a locked zone will be affected as if the card completely resided in the locked zone. Alternatives to this approach can be that a card must completely reside in a locked zone in order to be subjected to a user action, more than 50% of a card must reside in a locked zone in order to be subjected to a user action, or another preset value as a percentage of a card must reside in a locked zone in order for the card to be affected by a user action.

In step 2315, the cards that are determined to reside over a locked zone will be capable of being moved in a vertical direction (up/down). Likewise, in step 2320 the cards that are determined to reside in a regular zone (or not residing in the locked zone) will be restricted from being moved in a vertical direction. Step 2325 provides that cards that reside in the locked zoned can be subjected to a user operation including cutting the card's contents, pasting to the card, enlarging the contents of the card, shrinking the contents of the cards, and the like. Hence, the user operation in this step will only affect cards in the locked zone, while leaving cards in the regular zone alone.

In step 2330, all of the cards from the plurality of cards will be capable of being moved in a horizontally (left or right). That is, a card that resided in a locked zone can be moved to a regular zone, while the card that was adjacent to the moved card can now occupy the locked zone (see FIGS. 16 and 17).

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for informational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes that can be substantially represented in computer readable media and so executed by a computer or processor, whether or not such computer or processor is explicitly shown. The computer readable media and code written on can be implemented in a transitory state (signal) and a non-transitory state (e.g., on a tangible medium such as CD-ROM, DVD, Blu-Ray, Hard Drive, flash card, or other type of tangible storage medium).

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Although embodiments which incorporate the teachings of the present disclosure have been shown and described in detail herein, those skilled in the art can readily devise many other varied embodiments that still incorporate these teachings. It is noted that modifications and variations can be made by persons skilled in the art in light of the above teachings.

The invention claimed is:

1. A method for displaying a user interface comprising:
generating a plurality of cards for a display area;
allowing cards from the plurality of cards that reside in a locked zone to be moved in a first direction;
restricting cards from the plurality of cards that reside in a regular zone from being moved in said first direction;
allowing all of the cards from the plurality of cards that reside in the display area to be moved in a second direction; and
allowing only cards disposed in said locked zone to be affected by a first set of user initiated operations;
allowing only cards residing in said regular zone to be affected by a second set of user initiated operations.

2. The method of claim 1, further comprising subjecting only the cards in the locked zone to a user action.

3. The method of claim 2, wherein a first set of the user action is at least one of:
cutting the cards' content, pasting content to the cards, enlarging the contents of the cards, and shrinking the contents of the cards.

4. The method of claim 3, further comprising:
allowing a card from the plurality of cards that previously resided in a regular zone, after being moved in a horizontal direction after a user command, which now occupies the locked zone to be moved in a vertical direction, while restricting a card from the plurality of cards that previously occupied the locked zone which now resides in the regular zone from being moved in a vertical direction, after being moved horizontally after the same user command.

5. The method of claim 1, further comprising determining which card from the plurality of cards resides in a locked zone, said determining comprising at least one of:
determining whether the card completely resides in a locked zone, where part of the card resides in the locked zone,
determining whether 50% of a card resides in the locked zone, and
determining whether a predetermined amount of the card resides in the locked zone.

6. The method of claim 1, further comprising specifying the locked zone in response to a user command.

7. The method of claim 1, wherein the locked zone occupies at least two areas in the display area.

8. The method of claim 1, wherein the regular zone occupies at least two areas in the display area.

9. A device for displaying a user interface comprising:
a processor for generating a plurality of cards for a display area;
a display area responsive to said user interface and said processor for allowing cards from the plurality of cards that reside in a locked zone to be moved in a first direction;
a locked zone for restricting cards from the plurality of cards that reside in a regular zone from being moved in said first direction; and
said processor allowing all of the cards from the plurality of cards that reside in the display area to be moved in a second direction;

wherein said processor allowing only cards disposed in said locked zone to be affected by a first set of user initiated operations and said processor also allowing only cards residing in said regular zone to be affected by a second set of user initiated operations.

10. A method for displaying a user interface comprising the steps of:
generating a plurality of cards for a display area;
allowing cards from the plurality of cards that reside in a locked zone to be moved subjected to a first set of user initiated operations but not a second set of user initiated operations;
allowing cards residing in a regular zone to be moved subjected to a second set of user initiated operations but not the first set of user initiated operations; and
allowing all of the cards from the plurality of cards that reside in the display area to be moved in a horizontal direction.

11. The method of claim 10, wherein the first set or second set of user initiated operations is at least one of:
cutting the cards' content, pasting content to the cards, enlarging the contents of the cards, and shrinking the contents of the cards.

12. The method of claim 10, further comprising determining which card from the plurality of cards resides in a locked zone, wherein the determining further comprises at least one of:

determining whether the card completely resides in a locked zone, where part of the card resides in the locked zone,
determining whether 50% of a card resides in the locked zone, and
determining whether a predetermined amount of the card resides in the locked zone.

13. The method of claim 10, further comprising:
allowing a card from the plurality of cards that previously resided in a regular zone, after being moved in a horizontal direction after a user command, which now occupies the locked zone to be moved in a vertical direction, while restricting a card from the plurality of cards that previously occupied the locked zone which now resides in the regular zone from being moved in a vertical direction, after being moved horizontally after the same user command.

14. The method of claim 10, further comprising specifying the locked zone in response to a user command.

15. The method of claim 10, wherein the locked zone occupies at least two areas in the display area.

16. The method of claim 10, wherein the regular zone occupies at least two areas in the display area.

* * * * *